Jan. 3, 1956  T. J. REESE  2,729,467
ADJUSTABLE LOAD TRAILER HITCH
Filed Sept. 10, 1952  2 Sheets-Sheet 2
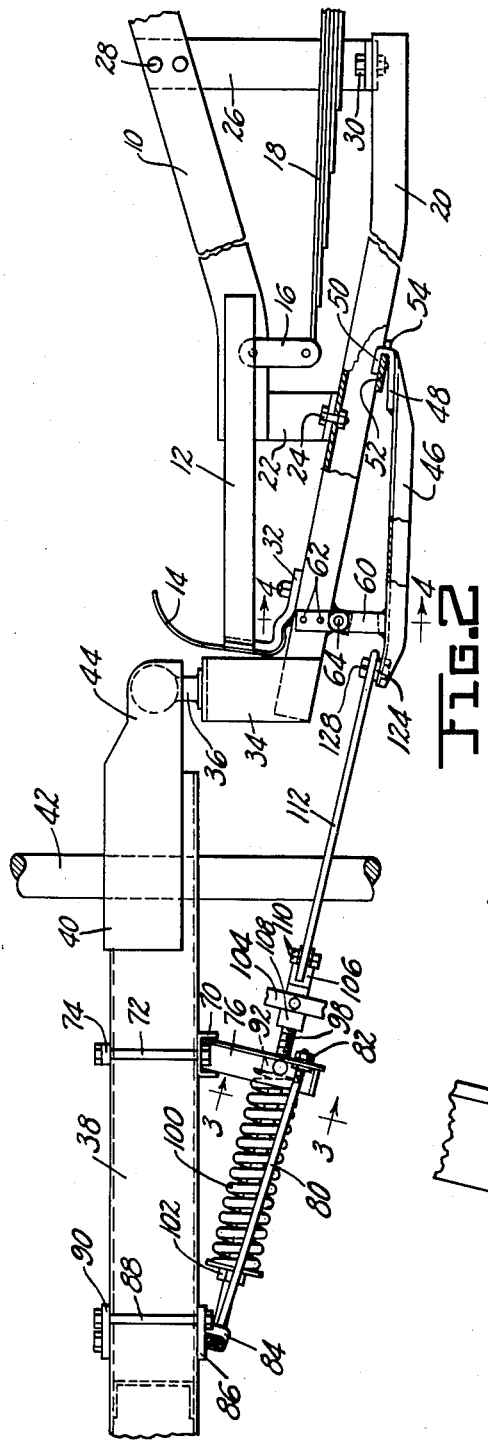
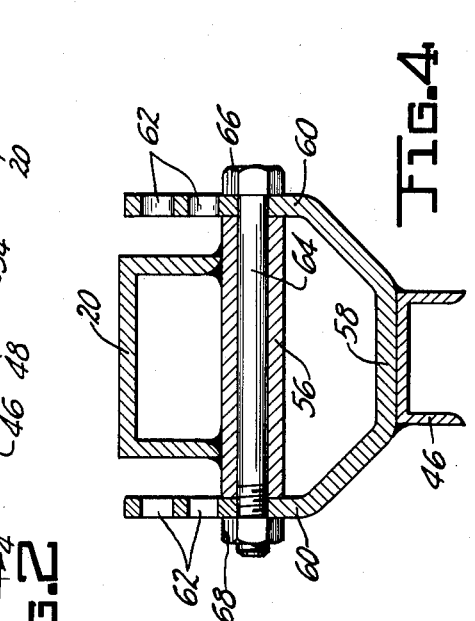
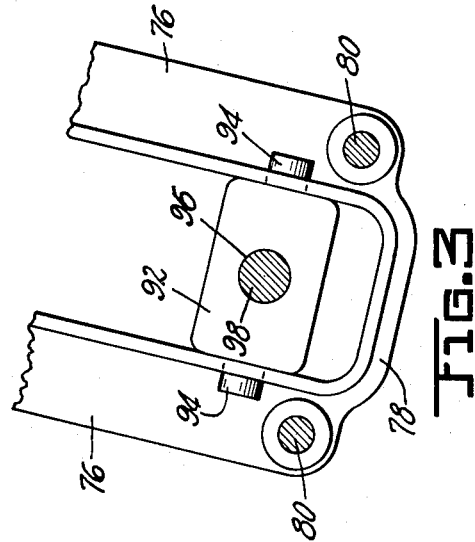
INVENTOR.
TERRELL J. REESE
BY
ATTORNEY.

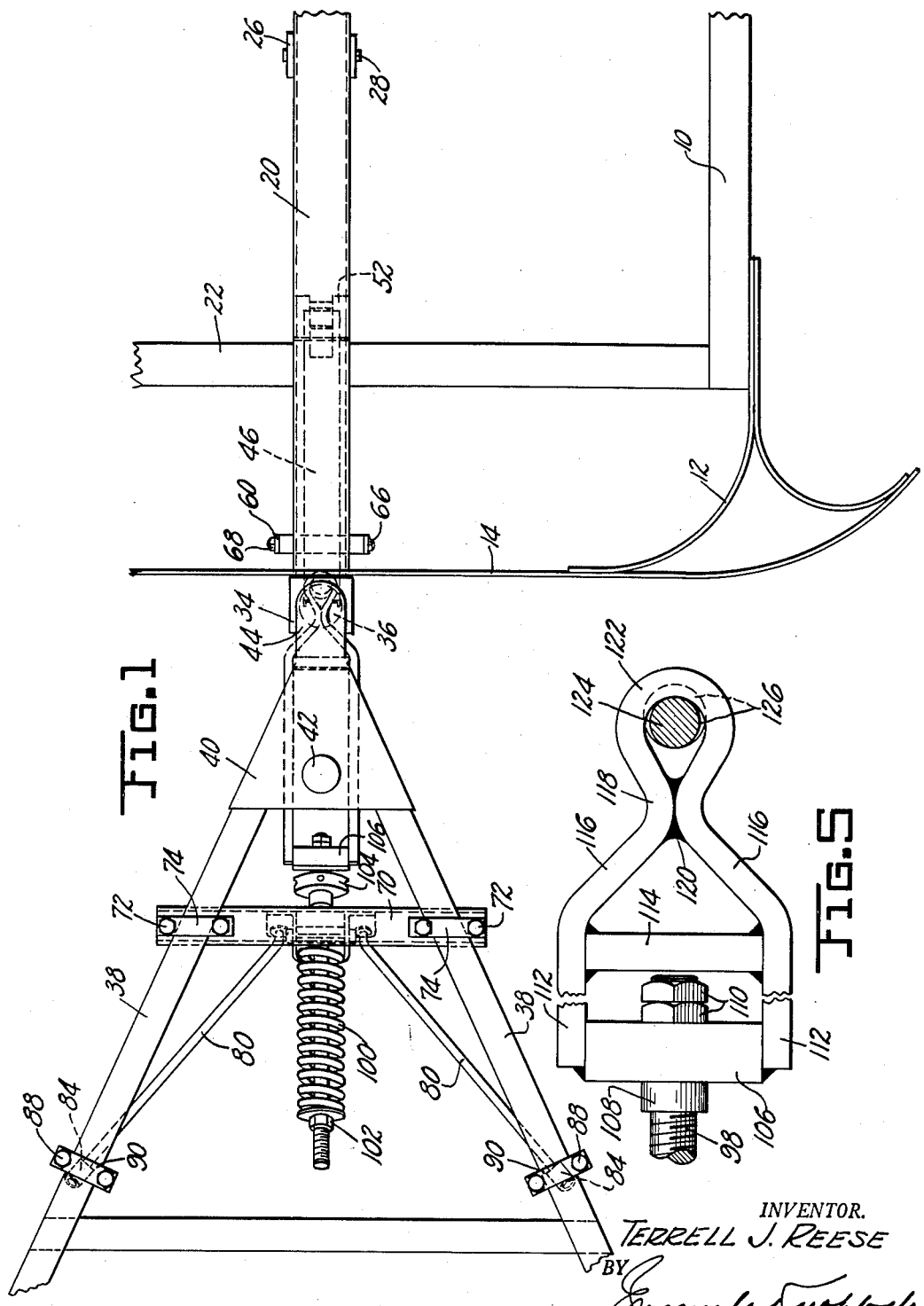

United States Patent Office 2,729,467
Patented Jan. 3, 1956

2,729,467

ADJUSTABLE LOAD TRAILER HITCH

Terrell J. Reese, Elkhart, Ind.

Application September 10, 1952, Serial No. 308,744

2 Claims. (Cl. 280—406)

This invention relates to improvements in trailer hitches, and more particularly to a hitch adapted to connect a trailing vehicle, such as a house trailer, to an automobile.

The construction of trailing vehicles, such as house trailers, is such that the wheels thereof are usually located rearwardly of the center of the vehicle so as to cause some weight of the trailing vehicle to be transmitted to the tractive vehicle. In the case of an automobile which is constructed to provide maximum riding comfort and which, accordingly, has springs which yield or flex to minimize jolting and jarring of the occupant, the transmission of this weight to the automotive vehicle imposes a heavier load upon the rear vehicle springs than they are normally designed to carry. Consequently, the vehicle springs yield under the weight applied by the trailer so that the automobile body and chassis are inclined downwardly and rearwardly with the body positioned at an unnatural tilted attitude and with the spring flexure remaining to absorb shock greatly reduced.

One solution for the problem presented by this condition is to add spring capacity to the vehicle by mounting overload springs thereon. That solution serves its intended purpose as long as the trailer is attached to the automobile; however, when the trailer is disconnected, the automobile rides uncomfortably because of the excess spring strength at the rear thereof preventing normal damping of vibration and shock by yielding of the springs. The use of overload springs also is undesirable because, when they are used, the tractor body tends to fulcrum about the rear axle under the load applied by the trailer, and this causes reduction of road traction and steering control at the front wheels.

It is the primary object of this invention to overcome the difficulties aforementioned by providing a hitch so constructed as to transmit a part of the load from the trailing vehicle to the front wheels of the tractive vehicle, that is, to distribute the weight transmitted by the trailer to the tractor between the front and rear wheels of the tractor.

A further object is to provide a hitch constructed on the principle of a truss.

A further object is to provide a hitch with an overload spring to regulate the transfer of the load from the trailing vehicle to the frame of the tractive vehicle.

A further object is to provide a hitch brace with a preload spring and adjustable means for maintaining the desired amount of tension on that spring, both when connected to the tractive vehicle and when disconnected therefrom.

A further object is to provide a hitch brace with preload spring means acting to apply the force of the spring to the parts of the brace in tension only and thereby to permit the use of parts of thin cross-section and light weight.

A further object is to provide a hitch unit having a releasable ball and socket connection between tractive and trailing vehicles and a second releasable spring-tensioned bracing connection between tractive and trailing vehicles which is spaced vertically from said first connection.

A further object is to provide a hitch with a rigid part connected to the body of a tractive vehicle at several longitudinally spaced parts to mount a kingpin, said rigid part providing detachable connection at longitudinally spaced points with a brace spaced below said kingpin.

A further object is to provide a hitch which is capable of distributing the load of a trailing vehicle between the front and rear wheels of the tractive vehicle, which hitch is so constructed as to be light in weight, to be adapted for assembly simply and rapidly, and to provide for easy and convenient connection to and disconnection from tractive and trailing vehicles.

Other objects will be apparent from the following specification.

In the drawings:

Fig. 1 is a top plan view of the hitch and associated parts of the tractive and trailing vehicles.

Fig. 2 is a side view of the hitch in assembled or connected position with respect to the tractive and trailing vehicles and with parts thereof shown in section.

Fig. 3 is an enlarged detail sectional view taken on line 3—3 of Fig. 2.

Fig. 4 is an enlarged detail sectional view taken on line 4—4 of Fig. 2.

Fig. 5 is an enlarged fragmentary detail view of a pivot.

Referring to the drawings which illustrate a preferred embodiment of the invention, the numeral 10 designates a part of the frame or chassis of an automobile, and, particularly, designates longitudinal chassis members. Bumper brackets 12 are carried by the rear of the chassis frame and serve to mount a conventional rear bumper 14. The frame 10 also pivotally mounts spring shackles 16 by means of which vehicle springs 18 are mounted in the conventional manner.

The vehicle chassis has fixedly secured thereto a rigid hitch carrier. This hitch carrier preferably comprises an elongated longitudinally extending inverted channel 20 of suitable strength to be rigid. The carrier 20 is mounted intermediate its ends to the rear of the chassis or frame by means of a depending rigid bracket 22 bolted or otherwise secured to the member 20 at 24. The front end portion of the carrier 20 is likewise mounted by means of a rigid bracket 26 fixedly secured at its upper end to the chassis at 28 forwardly of the bracket 22 and preferably forwardly of the spring shackle 16 but rearwardly of the rear axle (not shown). Bolts 30 connect the lower end of the bracket 26 and the front end portion of the elongated carrier 20.

The carrier 20 is preferably of a length to extend rearwardly beyond the bumper 14 and, if desired, may mount a bracket 32 adapted for hooked supporting engagement with the bumper 14. At its rear end the carrier 20 fixedly mounts a rigid upright portion 34 which carries a kingpin 36 at its upper end, said kingpin preferably being located at a level adjacent the level of the upper portion of the bumper 14. As best seen in Fig. 2, the carrier 20 is preferably inclined upwardly and rearwardly for at least a part of its length.

The trailing vehicle will include the usual longitudinally forwardly converging rigid frame projections 38 which converge and are secured together at their forward ends by a rigid plate or bracket 40 which commonly provides means for mounting a jackscrew 42. The member 40 may form part of a detachable hitch unit of conventional character having a forward socket portion 44 in which the kingpin 36 is releasably received and which cooperates with that kingpin to provide a swivel joint.

The construction of the socket 44, being substantially standard or conventional, will not be described herein.

A rigid elongated brace member 46, preferably constituting an inverted channel, is adapted to be secured to the carrier 20 to extend in rearwardly diverging relation thereto and preferably therebelow. The forward end of the brace member 46 has secured thereto, as by welding or the like, the shank portion 48 of a hook which includes an upwardly extending return bent portion 50. The carrier member 20 has a cross-plate 52 welded or otherwise fixedly secured thereto intermediate the mounting braces 22 and 26 therefor and adapted to be engaged by the hook 48, 50. The plate 52 will be rigid and preferably has a notch 54 at its front margin adapted to receive the hook 50 in a manner to prevent lateral movement of the hook relative to the plate 52.

The carrier member 20 also mounts, as by welding at its lower margins, an elongated transverse tube 56 which is located adjacent the rear end of the carrier. A yoke member has a base 58 welded or otherwise secured to the top of the brace member 46 and has upwardly projecting arms 60 which are spaced apart a distance greater than the width of the carrier 20 and greater than the length of the tube 56. The arms 60 have a plurality of spaced apertures 62 formed therein. A bolt having a shank 64 extends through the tube 56 and a selected set of the apertures 62, said bolt having a head 66 at one end thereof and mounting a nut 68 at its opposite end. The arrangement is such that the longitudinal attitude or tilt relation of the brace member 46 relative to the rear inclined portion 20 of the carrier may be adjusted as desired to vary the spacing between the rear end of the brace member 46 and the rear end of the carrier 20. It will be apparent that the hook 48, 50 will control the longitudinal position of the brace while permitting the brace to swing relative to the carrier.

A transversely extending elongated inverted rigid channel member 70 is secured to the tongue-defining frame parts 38 of the trailing vehicle rearwardly of the coupling part 40 thereof, as illustrated in Fig. 1. The member 70 preferably is secured in operative position by means of bolts 72 passing therethrough and through cross-plates 74 which bear against the top surfaces of the frame members 38 and extend thereacross. Intermediate its ends the cross-member 70 has fixedly secured thereto spaced depending arms 76 which may be flanged or ribbed to strengthen the same and which preferably are connected at their lower ends by a cross-member 78.

The lower end portions of the arms 76 are apertured to receive tie-rods 80 having heads 82 bearing against the front surface of said arms. The tie-rods 80 extend rearwardly in upwardly and outwardly diverging relation and pass through apertures in ears 84 depending from plates 86 which are fixedly clamped or anchored to the trailer frame parts 38. As here illustrated, each of the plates 86 bears against the bottom surface of a frame member 38 and receives vertical bolts 88 passing at opposite sides of the frame members and through apertures in a cross-plate 90 bearing against the top of the frame members 38. The bolts 88 are provided with nuts which cooperate therewith to fixedly clamp and position the plates 86 and 90 in desired location upon the frame members 38.

A trunnion member 92 is pivoted by means of pins 94 projecting from its ends and journalled in apertures formed in the arms 76. The pins 94 extend to provide a horizontal pivot axis for the trunnion which extends transversely of the direction of travel of the trailing vehicle. The trunnion member 92 has a central aperture 96 in which is slidably received an elongated rigid shaft 98. A portion of the shaft projects rearwardly of the trunnion and is encircled by an elongated coil spring 100. The rear end portion of the shaft 98 is screw-threaded and adjustably mounts thereon a screw-threaded abutment member 102. The front portion of the shaft 98 is also screw-threaded and it mounts thereon a screw-threaded abutment member 104 which, when the trailer hitch is assembled as illustrated in Fig. 2, is positioned forwardly of the trunnion 92 and the trunnion carrier 76. The forward end portion of the shaft 98 passes through an aperture in a rigid transverse member 106 to which the shaft is fixedly secured, said shaft mounting lock nuts 110 bearing against the member 106. A pair of rigid longitudinal rods or arms 112 are welded or otherwise fixedly secured to the opposite ends of the member 106 and are interconnected by a cross-brace 114 spaced from the transverse member 106. The members 112 are bent inwardly to provide forwardly converging runs or portions 116 which provide a neck portion 118 at which the parts 116 are welded together at 120. A loop 122 projects longitudinally from the neck 118.

The rear end of the brace member 46 fixedly mounts an upwardly projecting pin 124. This pin has an eccentric circumferential groove 126 intermediate its height adapted to receive the front part of the loop 122. A latch, such as a cross-pin 128, may be detachably carried by the upper end of the pin to bear against the top of the loop 122 and retain the loop on the pin.

In the use of the hitch, assuming that the parts have been connected together as illustrated in Figs. 1 and 2, it will be observed that the action of the swivel coupling 36. 44 in interconnecting the tractive and trailing vehicles is supplemented by a brace extending longitudinally and below the coupling 36, 44. This brace is made up of the parts 46, 112 and 98 as far as longitudinal members are concerned. The front part 46 of this brace is anchored in fixed position to the rigid carrier member 20 and with respect to the vehicle frame member 10. It will be observed that the longitudinal spacing of the connections between the parts 46 and 20 at 50 and 64 serves to fixedly position or orient the brace member 46 relative to the carrier 20. Likewise, the longitudinal spacing of the connections at 22, 26 and 32 between the carrier 20 and the vehicle chassis fixedly orients the carrier 20 relative to the vehicle chassis. The pull of the spring 100 exerted rearwardly upon the parts 98, 112 and 46 provides a tensioned brace acting in such a manner as to exert an upward acting thrust on the connected ends of the vehicles and the swivel coupling 36, 44 therebetween. The amount of tension exerted by the spring 100 is easily regulated by adjustment of the position of the abutment nut 102 upon the threaded shaft 98.

Inasmuch as the carrier 20 is fixedly connected to the chassis at longitudinally spaced points thereof, and inasmuch as the brace member 46 is longitudinally connected at spaced points to the carrier 20, the exertion of a rearward pull upon the brace 46 tends to exert a downward forward tilting action upon the tractive vehicle. This insures that some of the weight of the trailing vehicle, which is transferred to and must be sustained by the tractive vehicle, will be applied to the front axle of the tractive vehicle. Thus it is possible, by adjusting the location of the abutment screw 102, to regulate the attitude of the tractive vehicle when connected to a trailer, and also to accommodate connection of trailers of different weights to an automobile. Thus by a simple adjustment, a trailer may vary the riding properties of the tractive vehicle.

The device is easily applied to an automobile by the mounting of the carrier 20 which may be maintained upon the automobile as a permanent part, if desired. The brace member 46 may also be permanently attached to the vehicle, if desired. However, the brace 46 will usually be removed when the trailer is disconnected from the tractive vehicle, and the disconnection of the brace 46 is accomplished simply by the removal of the nut 68 from the bolt shank 64 and the removal of that bolt from the operative position illustrated in Fig. 4. The removal of the bolt 64 frees the brace for longitudinal movement to disengage the hook 50 from the cross-plate 52.

Before the trailer is disconnected from the tractive vehicle, the abutment 104 will be threaded into engagement with the trunnion 92 to maintain the desired compression of the spring 100. Later, when the trailer is to be connected, the shank 98 and the arms 112 are held against lengthwise movement relative to the trunnion, but are free to swing vertically about the trunnion pins 94. This action facilitates passage of the loop 122 around the pin 124 to interconnect the parts of the brace. The interconnection of the swivel coupling 36, 44 is then effected; the screw-jack 42 is then elevated; and the abutment member 104 is returned to the position illustrated in Fig. 2 spaced from the trunnion 92, leaving the parts free to move under the action of the spring 100. It will be apparent, therefore, that the setting of the spring 100 is maintained as desired at all times when the trailer is connected and when it is disconnected. It is not necessary, therefore, to reset the spring tension each time the trailer is connected.

It will be apparent that the spring 100 pulls upon the brace parts 98, 112 and 46 to place them in tension at all times when the trailer hitch is operative to connect a tractive and trailing vehicle. This constitutes a substantial advantage in the device by way of minimizing the cross-sectional size and the weight of the brace member and the hitch. Consequently, excessive load conditions are not experienced.

The relation of the positions of the centers of the swivel coupling 36, 44 and the pivot coupling 122, 124 as illustrated, with the lower pivot coupling 122, 124 located spaced below and slightly forwardly of the pivot center of the coupling 36, 44 is of advantage in the device in that it accommodates release of the tension of the spring 100 during turning of the tractor-trailer combination. This release of spring tension avoids stress on the tractor in a direction which might tend to tip the tractor laterally. This release of spring tension occurs because the projection of the trailer-carried lower brace forwardly relative to the projection of the swivel coupling 36, 44 normally provides a greater arc of travel during turning of the vehicle than is provided by the swivel coupling. The swivel coupling constitutes the actual center of the pivoting of the various parts, however, and the elongated lower unit 98, 112 tends to swing laterally to provide a straight line connection between those parts and the brace part 46. Thus a shortening of the lower projecting parts 98, 112 can occur as accommodated by the action of the spring 100.

While the preferred embodiment of the invention has been described and illustrated herein, it will be understood that changes in the construction may be made within the scope of the appended claims without departing from the spirit of the invention.

I claim:

1. A hitch for detachably connecting tractive and trailing vehicles, comprising a detachable two-part swivel coupling, coupling carriers adapted to be fixedly secured to said tractive and trailing vehicles, a guide carried by the trailer-mounted carrier, an elongated member slidable endwise in said guide, a spring urging said member rearwardly, and a pivot connection between said tractor-mounted carrier and said member, said pivot being spaced below said coupling, a bracket depending from said trailer-mounted carrier, and inclined braces connecting the lower parts of said bracket to said carrier, said bracket journaling said guide on a horizontal axis transverse of said vehicle.

2. A hitch for detachably connecting tractive and trailing vehicles, comprising a detachable two-part swivel coupling, coupling carriers adapted to be fixedly secured to said tractive and trailing vehicles, a guide carried by the trailer-mounted carrier, an elongated member slidable endwise in said guide, a spring urging said member rearwardly, and a pivot connection between said tractor-mounted carrier and said member, said pivot being spaced below said coupling, a bracket depending from said trailer-mounted carrier, and inclined braces connecting the lower parts of said bracket to said carrier, said bracket journaling said guide on a horizontal axis transverse of said vehicle, said elongated member mounting a longitudinally adjustable abutment on its rear end, said spring being a coil spring encircling said elongated member and bearing against said abutment and said guide at its opposite ends.

References Cited in the file of this patent

UNITED STATES PATENTS

| | | |
|---|---|---|
| 2,438,032 | Bready | Mar. 16, 1948 |
| 2,493,874 | Hume | Jan. 10, 1950 |
| 2,507,189 | Arehart | May 9, 1950 |
| 2,597,657 | Mathisen | May 20, 1952 |
| 2,680,626 | Hedgepeth | June 8, 1954 |